US010006305B2

(12) United States Patent
Derrien et al.

(10) Patent No.: US 10,006,305 B2
(45) Date of Patent: Jun. 26, 2018

(54) TOOLING FOR REMOVING SAND FROM A TURBINE ENGINE

(71) Applicant: SNECMA, Paris (FR)

(72) Inventors: Gerard Derrien, Orsay (FR); Sebastien Wilk, Saulx-les-Chartreux (FR)

(73) Assignee: SNECMA, Paris (FR)

( * ) Notice: Subject to any disclaimer, the term of this patent is extended or adjusted under 35 U.S.C. 154(b) by 637 days.

(21) Appl. No.: 14/421,247

(22) PCT Filed: Aug. 5, 2013

(86) PCT No.: PCT/FR2013/051884
§ 371 (c)(1),
(2) Date: Feb. 12, 2015

(87) PCT Pub. No.: WO2014/027157
PCT Pub. Date: Feb. 20, 2014

(65) Prior Publication Data
US 2015/0198060 A1    Jul. 16, 2015

(30) Foreign Application Priority Data
Aug. 14, 2012    (FR) .................................... 12 57808

(51) Int. Cl.
*B08B 5/04* (2006.01)
*B08B 7/04* (2006.01)
(Continued)

(52) U.S. Cl.
CPC .............. *F01D 25/002* (2013.01); *B08B 5/04* (2013.01); *B08B 7/0021* (2013.01); (Continued)

(58) Field of Classification Search
None
See application file for complete search history.

(56) References Cited

U.S. PATENT DOCUMENTS

| 2005/0035096 A1 | 2/2005 | Kilburn |
| 2007/0215174 A1 | 9/2007 | Kruger et al. |
| 2011/0220143 A1 | 9/2011 | Buske et al. |

FOREIGN PATENT DOCUMENTS

| EP | 1 570 921 | 9/2005 |
| RU | 857567 A1 | 8/1981 |

(Continued)

OTHER PUBLICATIONS

International Search Report dated Oct. 18, 2013 in PCT/FR13/051884 filed Aug. 5, 2013.

*Primary Examiner* — Eric W Golightly
*Assistant Examiner* — Arlyn I Rivera-Cordero
(74) *Attorney, Agent, or Firm* — Oblon, McClelland, Maier & Neustadt, L.L.P.

(57) ABSTRACT

Tooling for removing sand from a turbine engine, such as an airplane turbojet, the tooling including at least one endoscopic display device including a display and a duct having light guide and image transmission device mounted therein, a suction device having a suction device connected to a suction duct fastened to the duct of a display device, and a plasma jet generator device including a plasma torch connected to gas supply and electricity power supply suitable for operating the plasma torch, the plasma torch being fastened to the duct of an above-mentioned display device.

8 Claims, 2 Drawing Sheets

(51) Int. Cl.
*B08B 9/00* (2006.01)
*B08B 9/027* (2006.01)
*C25F 1/00* (2006.01)
*F01D 25/00* (2006.01)
*F02C 7/30* (2006.01)
*C23F 1/00* (2006.01)
*B08B 7/00* (2006.01)

(52) U.S. Cl.
CPC .............. *B08B 7/0071* (2013.01); *B08B 7/04* (2013.01); *B08B 9/00* (2013.01); *F02C 7/30* (2013.01)

(56) References Cited

FOREIGN PATENT DOCUMENTS

| | | | |
|---|---|---|---|
| RU | 953992 | A3 | 8/1982 |
| RU | 1134801 | A1 | 1/1985 |

TOOLING FOR REMOVING SAND FROM A TURBINE ENGINE

BACKGROUND OF THE INVENTION

Field of the Invention

The present invention relates to tooling for removing sand from a turbine engine, such as an airplane turbojet.

Description of the Related Art

When operating in certain geographical zones, a turbine engine absorbs a certain quantity of sand, which is mixed with residues generated by imperfect combustion of kerosene in the combustion chamber. This mixture can then become stuck to the inside walls of the turbine engine, downstream from the combustion chamber. The layer as formed in this way on said walls is constituted both by fine particles of sand and by a compacted agglomeration of polluted sand. The presence of this layer makes it difficult, if not impossible, to perform visual inspection of certain portions of the turbine engine during maintenance operations, in particular concerning the low pressure and high pressure turbines. There is also a risk of such particles degrading certain bearings in the turbine engine.

Access to the inside space of a turbine engine is restricted and makes it difficult to clean the walls in question, thus making it necessary to perform lengthy and expensive disassembly of the various portions of the turbine engine in order to be able to clean them.

Another solution consists in protecting certain portions of the turbine engine, such as bearings, and then in blowing compressed air into the enclosure of the turbine engine in order to detach the particles from the inside walls that are to be cleaned. That cleaning method is relatively inaccurate and can pollute other portions of the turbine engine while the air is being blown.

BRIEF SUMMARY OF THE INVENTION

A particular object of the invention is to provide a solution to this problem that is simple, effective, and inexpensive.

To this end, the invention provides tooling for removing sand from a turbine engine, such as an airplane turbojet, the tooling comprising at least one endoscopic display device comprising display means and a duct having light guide and image transmission means mounted therein, a suction device having suction means connected to a suction duct fastened to the duct of an above-mentioned display device, and a plasma jet generator device comprising a plasma torch connected to gas supply and electricity power supply means suitable for operating said plasma torch, said plasma torch being fastened to the duct of an above-mentioned display device.

In this way, it is easy to introduce the plasma torch fastened to the duct of the display device into an inside zone of the turbine engine in order to detach the layer of particles from a surface that is to be cleaned. The duct of the suction device then enables the detached particles to be sucked up. On each occasion, the display device makes it possible to ensure that the plasma torch of the suction duct is properly positioned, thereby facilitating the operation. The fact that the plasma torch and the suction duct are fastened to a duct of a display device makes handling of the tooling easy and thus facilitates cleaning by an operator.

In a first embodiment of the invention, the tooling comprises a first set of tooling constituted by a first display device coupled to a plasma jet generator device, and a second set of tooling constituted by a second display device coupled to a suction device.

In a second embodiment of the invention, the suction device and the plasma jet generator device are coupled to a single display device so as to form a single set of tooling.

Advantageously, the plasma torch is a cold plasma torch. This serves to avoid heating and damaging the walls that are to be cleaned of the turbine engine.

The invention also provides a method of removing sand from a turbine engine with the help of tooling of the first embodiment, the method being characterized in that it comprises the steps consisting in:

inserting both the plasma torch and the duct of the first display means simultaneously in the turbine engine in such a manner that the torch and the free end of said duct are situated facing a surface to be cleaned;

using the plasma torch to detach a layer of particles, e.g. such as a layer of sand, from the surface to be cleaned;

inserting both the suction duct and the duct of the second display means simultaneously into the turbine engine in such a manner that the ends of said ducts are situated facing the surface to be cleaned; and using the suction duct to suck up the previously detached particles.

Finally, the invention provides a method of removing sand from a turbine engine with the help of tooling of the second embodiment, the method being characterized in that it comprises the steps consisting in:

inserting the plasma torch, the duct of the suction means, and the duct of the display means simultaneously into the turbine engine in such a manner that the torch and the free ends of said ducts are situated facing a surface to be cleaned;

using the plasma torch to detach a layer of particles, e.g. such as a layer of sand, from the surface to be cleaned; and using the suction duct to suck up the previously detached particles.

BRIEF DESCRIPTION OF THE SEVERAL VIEWS OF THE DRAWINGS

The invention can be better understood and other details, characteristics, and advantages of the invention appear on reading the following description made by way of non-limiting example and with reference to the accompanying drawings, in which.

DETAILED DESCRIPTION OF THE INVENTION

Figure 1:
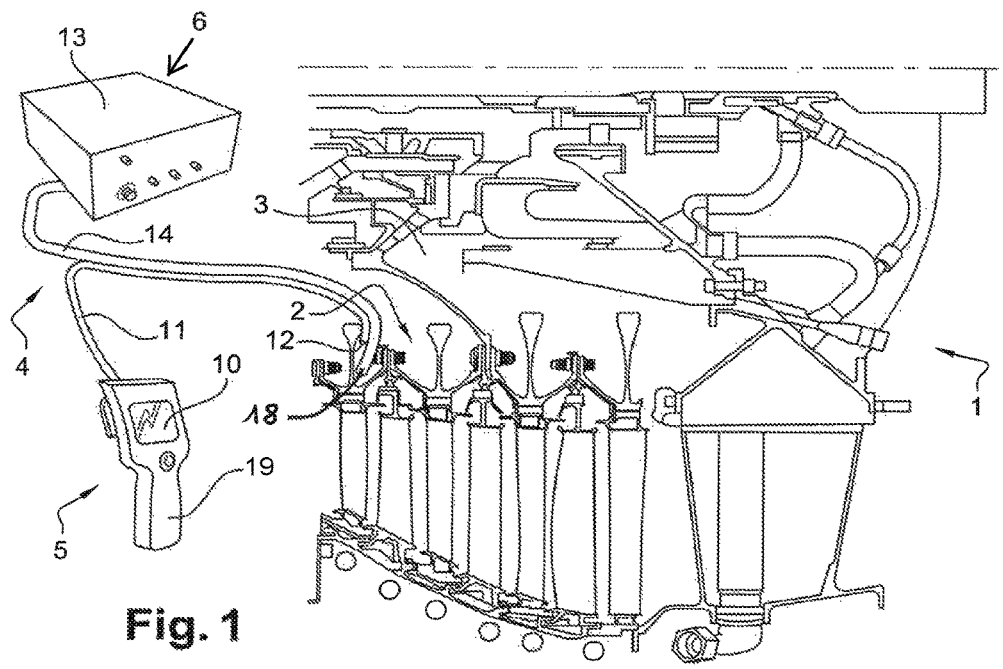
FIG. 1 is a diagrammatic view showing the use of a first set of tooling in a first embodiment of the invention.
Figure 2:
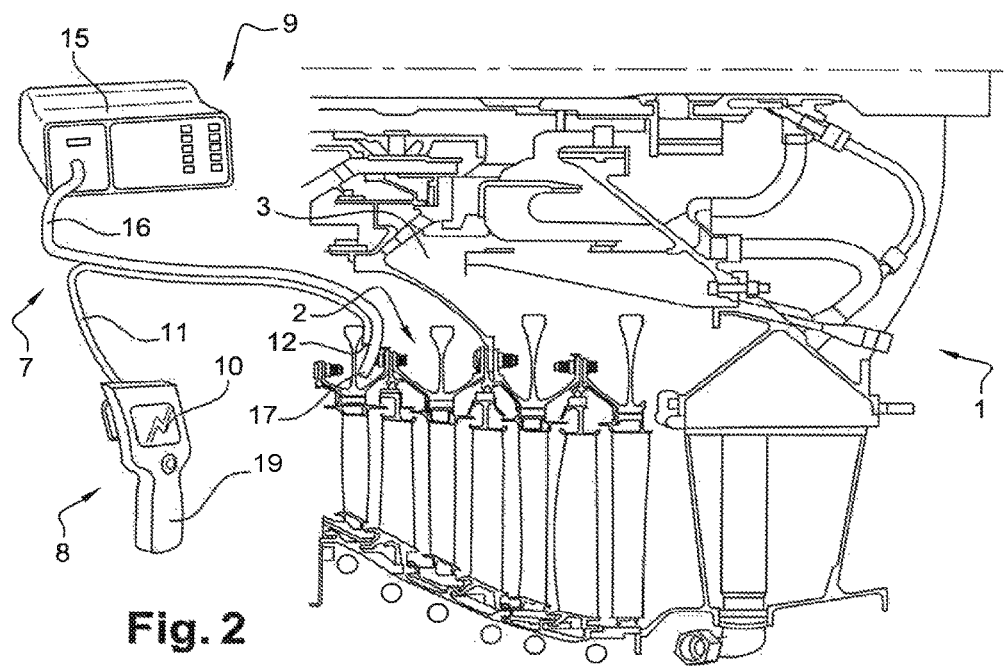
FIG. 2 is a diagrammatic view showing the use of a second set of tooling in the first embodiment of the invention.

FIGS. 1 and 2 show a method of removing sand from an internal portion of a turbojet module 1, which method is performed during a maintenance operation with the help of tooling in a first embodiment of the invention. By way of example, the module 1 is constituted by a portion of the high pressure turbine. This module 1 has been disassembled from the remainder of the turbojet during the maintenance operation.

As mentioned above, such removal of sand seeks to remove the layer of particles that are attached or stuck to the inside walls of the module 1, and that are difficult for an operator to access. In particular, it is necessary to be able to have access to the cavities 2 situated between the turbine disks and/or to other cavities 3 of the module 1. If such cleaning is effective, it becomes possible to proceed with visual inspection of the various portions of the module 1, without any need to disassemble it into submodules.

To this end, the tooling comprises a first set of tooling 4 made up of a first endoscopic display device 5 coupled to a plasma jet generator device 6, and a second set 7 of tooling formed by a second endoscopic display device 8 coupled to a suction device 9.

Each display device 5, 8 has display means 19, e.g. comprising a screen 10, and a duct 11 in which light guide and image transmission means are mounted. Thus, the image of an internal portion or wall of the module 1 situated facing the free end 12 of the duct 11 can be displayed on the screen 10 in order to be visible for an operator on the outside. The duct 11 is flexible, while nevertheless having a degree of stiffness, so as to be easily inserted in the module 1.

The plasma jet generator device 6 comprises a cold plasma torch 18 connected to gas supply and electrical power means 13 suitable for operating said plasma torch via corresponding supply lines 14. By way of example, these lines may be mounted in a sheath surrounding both the duct 11 of the first display device 5 and said lines 14. The torch is fastened to the duct 11 of the first display device 5.

A cold plasma torch is known in particular from Document US 2011/0220143.

The suction device 9 comprises suction means 15 connected to a suction duct 16 fastened to the duct 11 of the second display device 8. The two ducts 11 and 16 may be surrounded by a common sheath.

In order to clean the walls of the internal cavities 2 and 3 of the module 1, the operator begins by inserting both the plasma torch and the ducts 11 of the first display means 5 simultaneously into the turbine engine in such a manner that the torch and the free end 12 of the duct 11 are situated facing a surface that is to be cleaned.

The operator then detaches the layer of particles present on the above-mentioned surface with the help of the plasma torch, and then extracts the plasma torch and the ducts 11 from the module 1.

Thereafter, the operator inserts both the suction ducts 16 and the ducts 11 of the second display means 8 simultaneously into the module 1 in such a manner that the free ends 12 and 17 of said ducts 11 and 16 are situated facing said surface, and then proceeds to suck up the previously detached particles using the suction duct 16. Finally, the operator extracts the ducts 11 and 16 from the module 1.

It can be seen that the tooling of the invention enables the layer of particles to be removed quickly and easily, without requiring the module 1 to be disassembled. Furthermore, such cleaning does not require protection to be applied to certain portions of the module 1, such as bearings. Finally, the cleaning does not run any risk of polluting other portions of the module 1 or of the turbojet.

Figure 3:
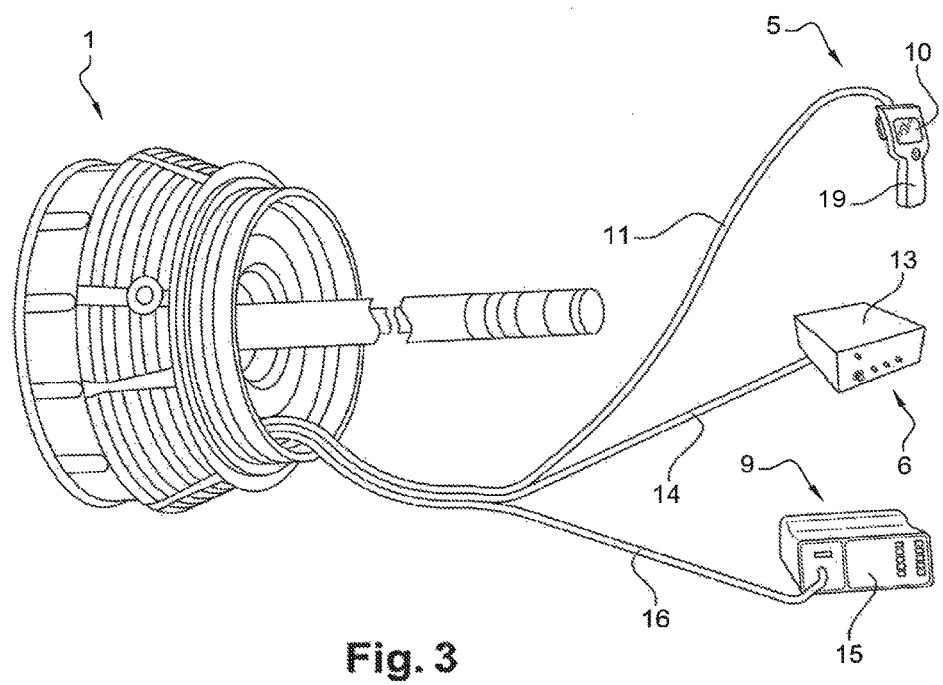
FIG. 3 is a diagrammatic view showing the use of tooling in a second embodiment of the invention.

FIG. 3 shows tooling in a second embodiment in which the suction device 9 and the plasma jet generator device 6 are coupled to a single endoscopic display device 5 so as to form a single set of tooling.

Under such circumstances, the torch is fastened to the duct 11 of the display device 5 and/or to the suction duct 16. These ducts 11 and 16 and the supply lines 14 for the plasma torch may be surrounded by a common sheath.

Under such circumstances, the method of removing sand is simpler since it consists in:
- inserting the plasma torch, the duct 16 of the suction device 9, and the duct 11 of the display means 5 simultaneously into the module 1 so that the plasma torch and the free ends 12 and 17 of said ducts 11 and 16 are situated facing a surface to be cleaned;
- detaching the layer of particles from said surface with the help of the plasma torch;
- sucking up the previously detached particles with the help of the suction duct 16; and
- simultaneously removing the plasma torch, the duct 16 of the suction device 9, and the duct 11 of the display device 5 from the module 1.

The invention claimed is:

1. A method of removing sand from a turbine engine, the method comprising:
   providing a tooling comprising at least one endoscopic display device comprising a display and a duct having light guide and an image transmission device mounted therein, a suction device connected to a suction duct fastened by a common sheath to the duct of the at least one endoscopic display device, and a plasma jet generator device comprising a plasma torch connected to a gas supply and an electricity power supply suitable for operating said plasma torch, said plasma torch being fastened by a common sheath to the duct of the at least one endoscopic display device, wherein the suction device and the plasma jet generator device are coupled to a single endoscopic display device so as to form a single set of tooling;
   inserting the plasma torch, the duct of the suction device, and the duct of the endoscopic display device simultaneously into the turbine engine in such a manner that the torch and free ends of said ducts are situated facing a surface to be cleaned;
   using the plasma torch to detach a layer of particles, from the surface to be cleaned; and
   using the suction duct to suck up the previously detached particles.

2. The method according to claim 1, wherein the surface to be cleaned is a surface of a turbine disk.

3. A method of removing sand from a turbine engine, the method comprising:
   providing a tooling comprising at least one endoscopic display device comprising a display and a duct having light guide and an image transmission device mounted therein, a suction device connected to a suction duct fastened by a common sheath to the duct of the at least one endoscopic display device, and a plasma jet generator device comprising a plasma torch connected to a gas supply and an electricity power supply suitable for operating said plasma torch, said plasma torch being fastened by a common sheath to the duct of the at least one endoscopic display device, wherein the tooling comprises a first set of tooling constituted by a first endoscopic display device coupled to the plasma jet generator device, and a second set of tooling constituted by a second endoscopic display device coupled to the suction device;
   inserting both the plasma torch and the duct of the first endoscopic display device simultaneously in the turbine engine in such a manner that the plasma torch and a free end of said duct are situated facing a surface to be cleaned;

using the plasma torch to detach a layer of particles from the surface to be cleaned;

inserting both the suction duct and the duct of the second endoscopic display device simultaneously into the turbine engine in such a manner that ends of said ducts are situated facing the surface to be cleaned; and using the suction duct to suck up the previously detached particles.

4. The method according to claim 3, wherein the surface to be cleaned is a surface of a turbine disk.

5. A tooling for removing sand from a turbine engine, the tooling comprising:

at least one endoscopic display device comprising a display and a duct having light guide and an image transmission device mounted therein, a suction device connected to a suction duct fastened by a common sheath to the duct of the least one endoscopic display device, and a plasma jet generator device comprising a plasma torch connected to a gas supply and an electricity power supply suitable for operating said plasma torch, said plasma torch being fastened by a common sheath to the duct of the at least one endoscopic display device.

6. The tooling according to claim 5, comprising a first set of tooling constituted by a first endoscopic display device coupled to the plasma jet generator device, and a second set of tooling constituted by a second endoscopic display device coupled to the suction device.

7. The tooling according to claim 5, wherein the suction device and the plasma jet generator device are coupled to a single endoscopic display device so as to form a single set of tooling.

8. The tooling according to claim 5, wherein the plasma torch is a cold plasma torch.

* * * * *

UNITED STATES PATENT AND TRADEMARK OFFICE
CERTIFICATE OF CORRECTION

PATENT NO. : 10,006,305 B2
APPLICATION NO. : 14/421247
DATED : June 26, 2018
INVENTOR(S) : Gerard Derrien et al.

It is certified that error appears in the above-identified patent and that said Letters Patent is hereby corrected as shown below:

In the Claims

Column 6, Line 2, Claim 5 change "of the least one endoscopic" to --of the at least one endoscopic--.

Signed and Sealed this
Eighteenth Day of June, 2019

Andrei Iancu
*Director of the United States Patent and Trademark Office*